US010121097B2

(12) United States Patent
Gembe et al.

(10) Patent No.: US 10,121,097 B2
(45) Date of Patent: Nov. 6, 2018

(54) METHOD FOR EFFICIENT FAN-OUT CONTROL

(71) Applicant: HEIDELBERGER DRUCKMASCHINEN AG, Heidelberg (DE)

(72) Inventors: Andreas Gembe, Leimen-Gauangelloch (DE); Martin Mayer, Ladenburg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/279,769

(22) Filed: Sep. 29, 2016

(65) Prior Publication Data
US 2017/0098142 A1 Apr. 6, 2017

(30) Foreign Application Priority Data
Oct. 6, 2015 (DE) .......................... 10 2015 219 245

(51) Int. Cl.
*G06K 15/02* (2006.01)
*H04N 1/60* (2006.01)
*B41J 19/14* (2006.01)

(52) U.S. Cl.
CPC ............. *G06K 15/027* (2013.01); *H04N 1/60* (2013.01); *H04N 1/6002* (2013.01); *H04N 1/6008* (2013.01); *H04N 1/6033* (2013.01); *H04N 1/6055* (2013.01); *B41J 19/147* (2013.01)

(58) Field of Classification Search
CPC .. G06K 15/027; H04N 1/6008; H04N 1/6002; H04N 1/6033; H04N 1/6055; B41J 19/147
See application file for complete search history.

(56) References Cited

U.S. PATENT DOCUMENTS

| 5,181,257 | A | * | 1/1993 | Steiner | ................ B41F 33/0036 101/211 |
| 5,806,431 | A | * | 9/1998 | Muth | .................... B41F 27/005 101/415.1 |
| 6,024,504 | A | | 2/2000 | Weichmann et al. | |
| 9,221,288 | B2 | | 12/2015 | Redmer et al. | |
| 9,555,618 | B2 | * | 1/2017 | Delang | .................. B41F 31/00 |

(Continued)

FOREIGN PATENT DOCUMENTS

| DE | 19724066 A1 | 12/1998 |
| DE | 10136747 A1 | 3/2002 |

(Continued)

*Primary Examiner* — Sharon A Polk
(74) *Attorney, Agent, or Firm* — Laurence A. Greenberg; Werner H. Stemer; Ralph E. Locher

(57) ABSTRACT

A printing method with fan-out control minimizes register deviations by using a computer. The method includes printing a test print including various color separations. The register deviations that have occurred relative to a reference color are measured. The absolute total of the register deviations of all color separations relative to one another is calculated. At least one color separation to be adapted is selected as a function of the calculated absolute total of all color separations. The at least one selected color separation is adapted. Finally, the register deviations that have occurred are compensates for by creating and using at least one printing plate for the adapted at least one color separation.

8 Claims, 3 Drawing Sheets

(56) References Cited

U.S. PATENT DOCUMENTS

| | | | |
|---|---|---|---|
| 2007/0216918 A1* | 9/2007 | Honeck | B41F 31/045 358/1.9 |
| 2011/0079160 A1* | 4/2011 | Hauck | B41F 33/0036 101/481 |
| 2015/0156376 A1* | 6/2015 | Paul | G03G 15/5062 358/1.9 |

FOREIGN PATENT DOCUMENTS

| | | |
|---|---|---|
| DE | 102010049945 A1 | 5/2011 |
| DE | 102012004238 A1 | 9/2012 |

\* cited by examiner

METHOD FOR EFFICIENT FAN-OUT CONTROL

CROSS-REFERENCE TO RELATED APPLICATION

This application claims the priority, under 35 U.S.C. § 119, of German Patent Application DE 10 2015 219 245.8, filed Oct. 6, 2015; the prior application is herewith incorporated by reference in its entirety.

BACKGROUND OF THE INVENTION

Field of the Invention

The present invention relates to a method for efficient fan-out control.

The technical field of the invention is the field of prepress processes.

A known phenomenon in printing technology, in particular for multicolor printing, is that when a number of colors are printed on top of one another to form a combined image, there are frequently deviations between the individual printed colors. Those register deviations result in a blurred multicolor image. That defect has various causes. For instance, it is possible that the individual printing units that successively print the individual color separations onto the printing substrate have not been configured properly and that consequently the individual color separations printed on top of one another are out of register as described above.

Another cause is the process-inherent deformation of the printing substrates caused by printing the color separations in the individual printing units. That leads to geometric deformations of the printed image, causing the local register errors described above as the next color separation is printed in the next printing unit. Different approaches have become known in the art to eliminate that phenomenon, which is also referred to as fan-out.

For instance, German Patent DE 197 24 066 B4, corresponding to U.S. Pat. No. 6,024,504, discloses a method for correcting geometric faults when information is transferred to a printing substrate. That method discloses a printing machine for imaging the printing formes in the machine, wherein at least one device-dependent matrix created in accordance with a device-independent description of the information to be printed is fed to a matrix manipulation device, which subjects the elements of the matrices to a correction transformation with the aid of correction functions and as a function of parameters that have been measured in advance, and wherein the transformed matrices are fed to at least one digital imaging unit. The corrections of the image data made in that way compensate for the geometric faults that have occurred. That method is fairly generic and is suitable for all kinds of geometric faults.

A process referred to as fan-out control (FOC) has become known for geometric faults that are specifically due to process-inherent deformations of the printing substrates. In that fan-out control process, the first step is to measure the register deviations relative to the reference color for all color separations or for all color separations minus a reference color. The reference color is usually black. However, any other color may be used as the reference color. Subsequently, a new set of register compensation plates is created either for all color separations or for all color separations minus the reference color. However, that process is time-consuming and expensive.

The fan-out phenomenon means that due to the mechanical stress and the humidity-induced expansion of the printing substrate, the dimensions on the printing substrate change for every print run through a printing unit to receive a new color. That dimension change results in a distortion of the image that has already been printed and receives the new color separations. The resultant register difference between the first printing unit and the second, third, and fourth printing units is generally considerable, yet relative to one another, the register deviations between the second, third, and fourth printing unit tend to be small. Nevertheless, in accordance with the prior art, all color separations minus the reference color are modified for paper expansion compensation. That is the reason why, as indicated above, it is a comparatively time-consuming, expensive process.

Since the register deviations thus exhibit the greatest difference between the first color separation and the second, third, and fourth color separations, respectively, whereas there are only minor deviations among the second, third, and fourth color separations, the question arises whether it is truly necessary to adapt the printing plates for all process colors (i.e. color separations) in the FOC process to reduce the register inaccuracies to an acceptable level.

SUMMARY OF THE INVENTION

It is accordingly an object of the invention to provide a method for efficient fan-out control, which overcomes the hereinafore-mentioned disadvantages of the heretofore-known methods of this general type and which allows a considerable increase in efficiency in terms of required time and money compared to the known method.

With the foregoing and other objects in view there is provided, in accordance with the invention, a method for reducing the amount of time and money required for fan-out control. The method of the invention is a printing method including fan-out control by using a computer to minimize register deviation, comprising the steps of:
1. printing a test print including various color separations;
2. measuring the register deviations that have occurred relative to a reference color;
3. calculating the absolute total of the register deviations of all color separations relative to one another;
4. selecting at least one color separation to be adapted as a function of the calculated absolute total of all color separations;
5. adapting the at least one selected color separation; and
6. compensating for the register deviations that have occurred by creating and using at least one printing plate for the adapted at least one color separation.

In order to attain the object of the invention, a crucial aspect is thus the selection of the at least one color separation to be adapted as a function of the calculated absolute total of all color separations. As this at least one selected color separation is adapted, a new printing plate is created for this adapted color separation and only for this color separation. In the vast majority of cases, register difference compensation for the color separation that causes the greatest register differences is sufficient to reduce the resultant total register differences to a level within acceptable tolerances. Thus the method of the invention requires much less time and effort than the fan-out control methods of the prior art which require all color separations to be corrected and consequently new plates to be made for all process colors that are used.

In accordance with another preferred mode of the method of the invention, in this context, the method additionally comprises the following steps:
1. calculating the remaining register deviations of the non-adapted color separations when the at least one adapted color separation is used;
2. evaluating the remaining register deviations in terms of maximum acceptable tolerances; and
3. implementing further measures if the remaining register deviations are outside the maximum acceptable tolerances.

Since in some cases the reduction of the total register inaccuracies by adapting the color separation with the greatest deviation is not sufficient to reduce the total deviations to an acceptable measure, it is necessary for the remaining register deviations of the as yet non-adapted color separations to be calculated once the adapted at least one color separation has been used. The remaining register deviations are then assessed to find out whether they are within the maximum acceptable tolerances. If they are outside the maximum acceptable tolerances, further measures of fan-out control are implemented to reduce the remaining register deviations to values within the maximum acceptable tolerances.

In accordance with a further preferred mode of the method of the invention, in this context, the further measures are selecting and adapting at least one further color separation.

The clearest further measure in the fan-out control process to reduce the remaining register deviations is to apply the method of the invention to the remaining color separations. Once a respective further color separation has been adapted, the remaining register deviations need to be assessed to find out whether they now are within the maximum permitted tolerances. If this is the case, no further color separations need to be adapted.

In accordance with an added preferred mode of the method of the invention, the maximum tolerances for remaining register deviations are predefined by an operator or in an automated way by a computer.

In general, the maximum permitted tolerances for register deviations are job-specific. Thus, in accordance with the fan-out control method of the invention, they need to be redefined for every new job. In this process, the tolerances may be entered manually by an operator monitoring the process or by the computer that implements the method of the invention or a higher-level computer. If the tolerances are defined in an automated way by a computer, the tolerance values are determined by an evaluation of prepress data.

In accordance with an additional preferred mode of the method of the invention, the maximum number of color separations to be adapted is predefined by an operator or in an automated way by a computer.

What has been explained above with respect to the maximum permitted tolerances for the remaining register deviations also applies to the maximum number of color separations to be adapted. The adaptation of further color separations naturally reduces the time and effort that is saved compared to the fan-out control method of the prior art wherein all color separations are adapted. Thus it may make sense to limit the maximum number of color separations to be adapted in the context of the method of the invention from the start. This may be done by an operator or likewise in an automated way by the computer that runs the method. In the case of such a fixed limit, however, one has to make sure that the permitted number of adaptation processes for the color separations is sufficient to reduce the occurring register deviations to an acceptable measure. The best way to do this is a statistical evaluation of the adapted color separations that were necessary for previous print jobs that have already been processed using the fan-out control of the invention. Based on a sufficient amount of data or experience (if a human operator is involved), the risk involved in limiting the maximum number of color separations in terms of the occurrence of remaining register deviations that are too great may be acceptable.

In accordance with yet another preferred mode of the method of the invention, in this context, the at least one color separation that is selected for adaptation is the one that has the greatest deviation of all color separations from one another in terms of the absolute total of the register deviations.

The best choice for the selection of the first color separation to be adapted is logically the color separation that has the greatest deviation of the absolute total of the register deviations of all color separations relative to one another. The adaptation of this color separation will logically lead to the greatest reduction of the total register deviations. If necessary, the order in which the remaining color separations are adapted is derived from the contribution each remaining color separation makes to the total remaining deviation.

In accordance with a further preferred mode of the method of the invention, in this context, the adaptation of the selected at least one color separation is implemented by calculating a register deviation that results from the difference of the color separations of the at least one color separation and the mean value of all other color separations.

This calculated register deviation for the selected at least one color separation is then used to create a FOC compensation printing plate for compensating the calculated register deviation for this selected at least one color separation.

In accordance with an added preferred mode of the method of the invention, in this context, the reference color is one of the colors that are used, only the color separation of the reference color is adapted and a new reference color is chosen among the remaining color separations.

In the method of the invention, the color separation that is chosen as the reference color is usually the one with the greatest register deviation relative to the other colors that are used. In a CMYK four-color printing process, this is usually black. In an alternative embodiment of the method of the invention, a reference color change is carried out wherein the adaptation of the color separation in accordance with the invention is only carried out for the former reference color and subsequently the reference color change is carried out.

In accordance with a concomitant preferred mode of the method of the invention, in this context, in every case, a minimum of two color separations are adapted, which are defined by an operator or in an automated way by a computer.

In this further alternative embodiment of the method of the invention, at least two color separations are adapted in every case. This is a moderated alternative that makes sense if the data on printing processes that have already been carried out using the fan-out control process of the invention have found that in a large number of cases, the adaptation of at least two color separations was necessary. In this case it makes sense to carry out the method for two color separations from the start to save the time and effort of assessing the remaining register deviations once a first color separation has been adapted.

Other features which are considered as characteristic for the invention are set forth in the appended claims.

Although the invention is illustrated and described herein as embodied in a method for efficient fan-out control, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
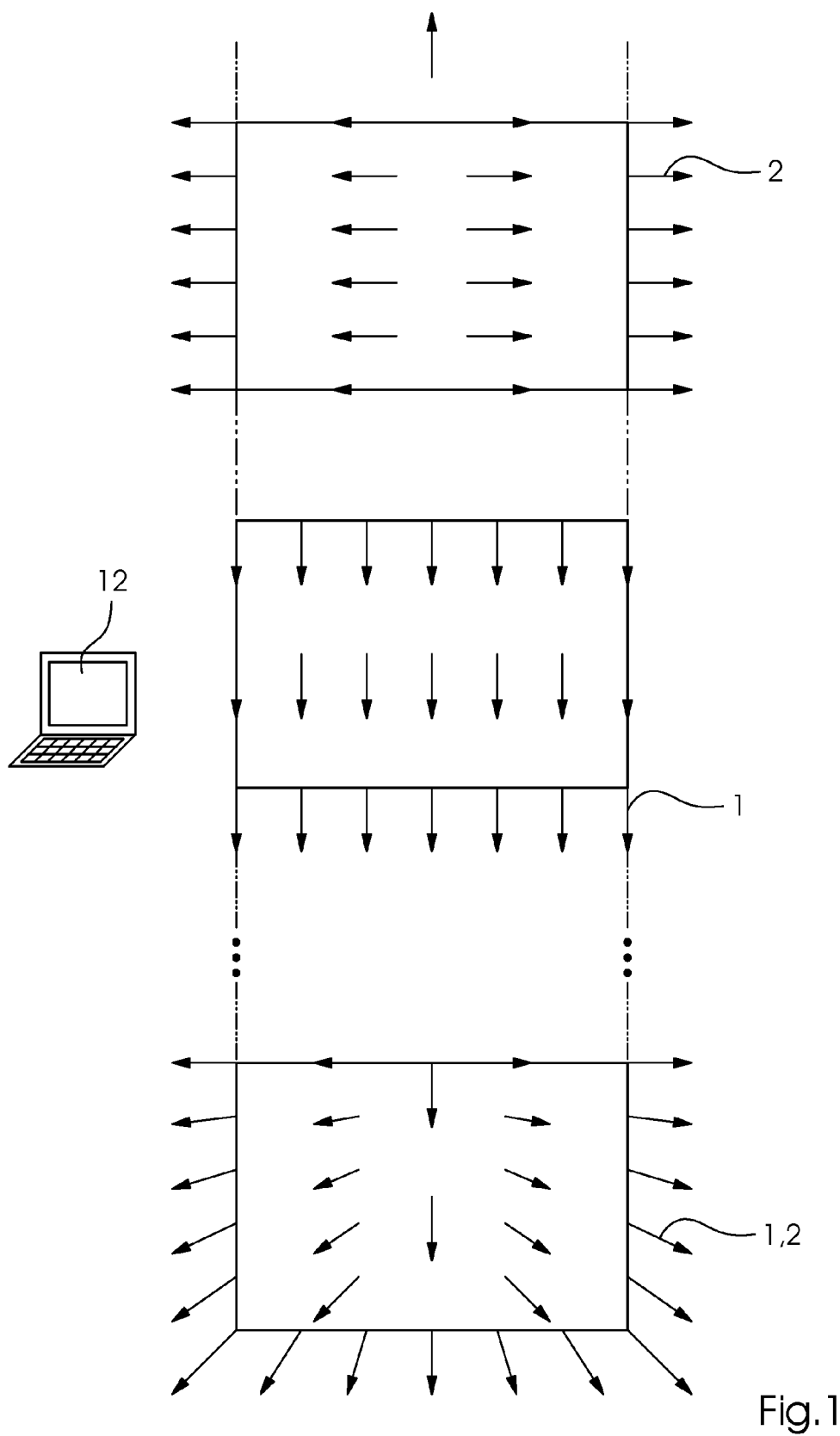
FIG. 1 is a schematic representation of the fan-out phenomenon.
Figure 2:
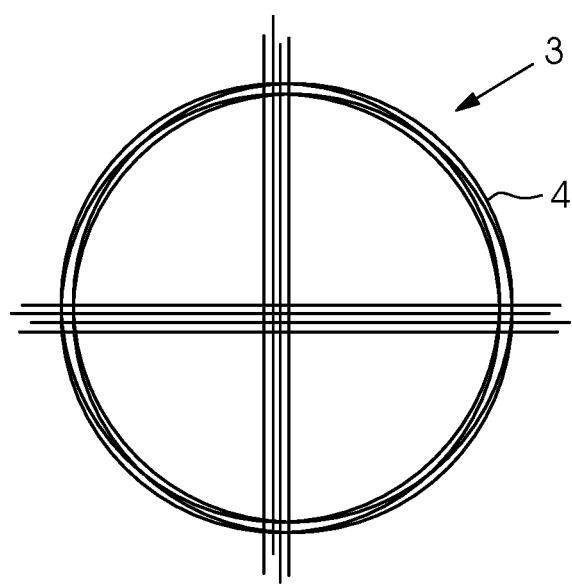
FIG. 2 illustrates the result of a local register deviation.

Referring now to the figures of the drawings in detail and first, particularly, to FIG. 2 thereof, there are seen register deviations 4 to be compensated for, which are schematically indicated in the form of a register cross 3, that is used to measure the accuracy of the positions of individual color separations that are printed on top of each other. The example shown in FIG. 2 clearly indicates the deviations 4 that occur between the individual color separations if there are local register inaccuracies. FIG. 1 shows that the causes for such local register inaccuracies may be process-inherent deformations of the printing substrates. This figure clearly shows deforming forces 2 that occur in a direction transverse to the printing direction and deforming forces 1 that occur in the printing direction. However, since these deforming forces influence one another, there are resultant deformations in all directions 1 and 2. These deformations 1 and 2 need to be factored in to obtain high-quality prints. For this purpose, a control unit 12 may carry out a fan-out control method known from the prior art.

Figure 3:
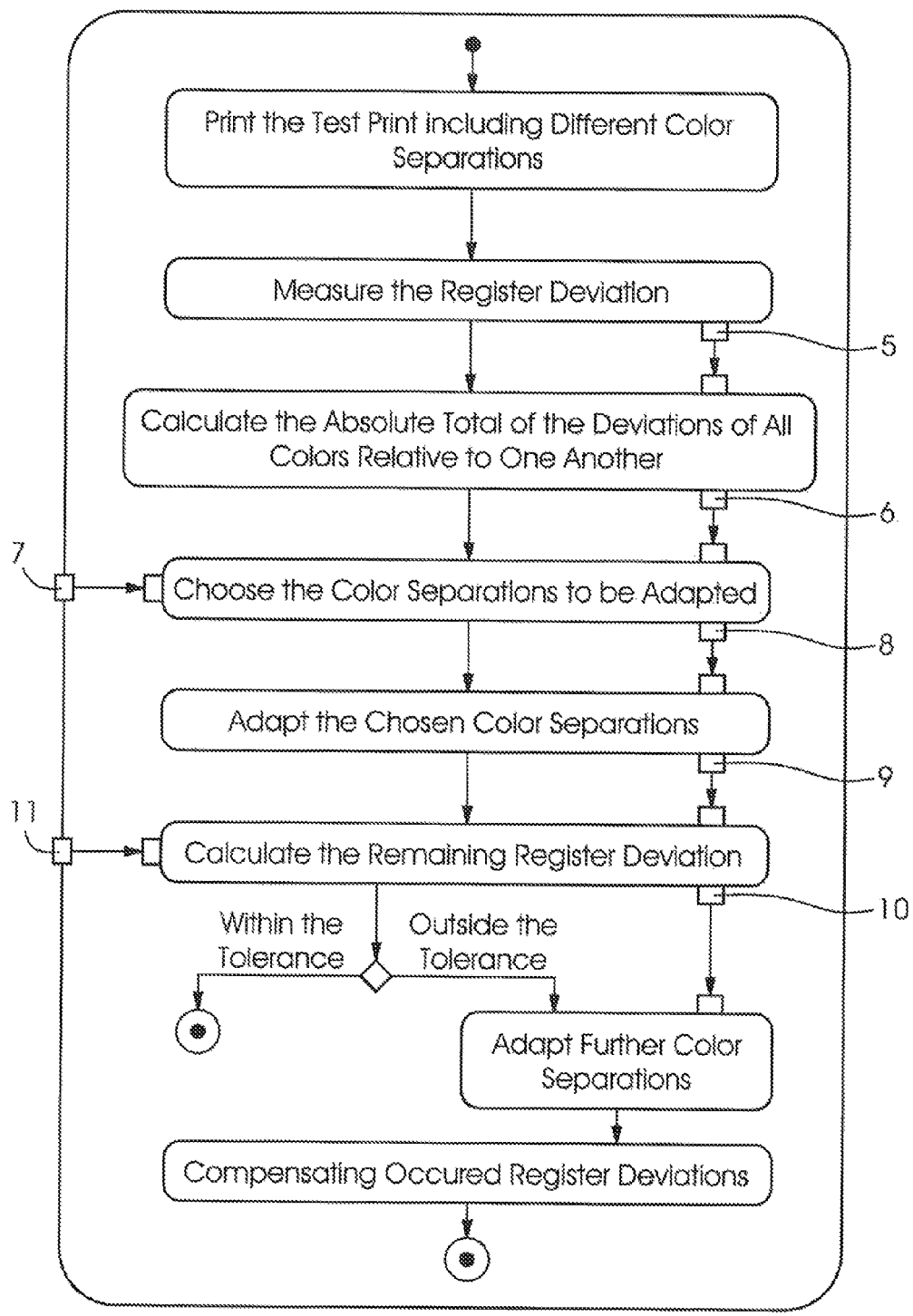
FIG. 3 is a flow chart of the method of the invention.

A preferred embodiment of the method of the invention for such fan-out control is shown diagrammatically in FIG. 3 and will be explained in more detail below based on an example.

The following table shows an example of a measured register deviation 5 without FOC (fan-out control).

| | | Register Deviation | | | | | |
|---|---|---|---|---|---|---|---|
| | | Narrower/Wider [mm] | | | Shorter/Longer [mm] | | |
| Place | Color | AS | MI | BS | AS | MI | BS |
| EP | Black | 0.00 | 0.00 | 0.00 | 0.00 | 0.00 | 0.00 |
| EP | Cyan | −0.11 | −0.05 | 0.01 | −0.14 | 0.05 | −0.09 |
| EP | Magenta | −0.10 | −0.07 | 0.01 | −0.12 | 0.02 | −0.20 |
| EP | Yellow | −0.07 | −0.07 | −0.05 | −0.15 | −0.01 | −0.20 |
| SP | Black | 0.00 | 0.00 | 0.00 | 0.00 | 0.00 | 0.00 |
| SP | Cyan | 0.05 | 0.06 | 0.04 | 0.05 | 0.06 | 0.09 |
| SP | Magenta | 0.06 | 0.06 | 0.04 | 0.17 | 0.11 | 0.03 |
| SP | Yellow | 0.07 | 0.07 | 0.06 | 0.17 | 0.10 | 0.07 |

The measured values are typical for register deviations in the transverse direction (narrower/wider) and in the circumferential direction (longer/shorter) caused by the corresponding deformations 1 and 2 at the end of printing (EP) and at the start of the printing (SP). The register deviations of the chromatic colors relative to one another are comparatively small but the deviations from the reference color black are considerable.

In accordance with the method of the prior art, a register correction is calculated for the chromatic colors using the FOC process and new plates are created. In general, that is done for all plates although black remains unchanged.

In contrast, the method of the invention now calculates the absolute total of the register deviations 6 in the transverse and circumferential directions between each color and all the other colors. The following values are the result:

| Absolute Total of the Register Deviation | | | | |
|---|---|---|---|---|
| | Black | Cyan | Magenta | Yellow |
| | Narrower/Wider | | | |
| Black | 0.00 | 0.32 | 0.34 | 0.39 |
| Cyan | 0.32 | 0.00 | 0.04 | 0.17 |
| Magenta | 0.34 | 0.04 | 0.00 | 0.13 |
| Yellow | 0.39 | 0.17 | 0.13 | 0.00 |
| | Shorter/Longer | | | |
| Black | 0.00 | 0.48 | 0.65 | 0.70 |
| Cyan | 0.48 | 0.00 | 0.39 | 0.36 |
| Magenta | 0.65 | 0.39 | 0.00 | 0.11 |
| Yellow | 0.70 | 0.36 | 0.11 | 0.00 |
| | Total [mm] | | | |
| Black | 0.00 | 0.58 | 0.73 | 0.80 |
| Cyan | 0.58 | 0.00 | 0.39 | 0.40 |
| Magenta | 0.73 | 0.39 | 0.00 | 0.17 |
| Yellow | 0.80 | 0.40 | 0.17 | 0.00 |
| Σ | 2.11 | 1.37 | 1.29 | 1.37 |

Then a total deviation, for instance the Euclidean distance, is calculated from the transverse direction values and the circumferential direction values, and the total is calculated for every color. In the given example, black has a deviation value of 2.11 mm relative to the other colors whereas the values for cyan, magenta, and black are much lower: 1.37, 1.30 and 1.37 mm. The greatest improvement is achieved if new plates are calculated for the color separation that has the highest deviation value. Thus the recommendation for the FOC in accordance with the method of the invention is:

| Desired Number of New Plates 7 | Recommendation Color Separation 8 |
|---|---|
| 1 | black |
| 2 | black and cyan or magenta |
| 3 | black, cyan, magenta |
| 4 | black, cyan, magenta, yellow |

If only one color separation is to be recalculated and recreated, as is the case in the current example, it is ideally the black separation that is used. For this color separation 8, a register deviation is calculated on the basis of the difference of the register deviation of the black separation (in this case zero) and the mean value of all other color separations at every measuring point. The following register deviations are the result:

| | | Register Deviation for FOC | | | | | |
|---|---|---|---|---|---|---|---|
| | | Narrower/Wider [mm] | | | Shorter/Longer [mm] | | |
| Place | Color | AS | MI | BS | AS | MI | BS |
| EP | Black | −0.09 | −0.06 | −0.01 | −0.14 | 0.02 | −0.16 |
| EP | Cyan | — | — | — | — | — | — |
| EP | Magenta | — | — | — | — | — | — |
| EP | Yellow | — | — | — | — | — | — |
| SP | Black | 0.06 | 0.06 | 0.05 | 0.13 | 0.09 | 0.06 |
| SP | Cyan | — | — | — | — | — | — |
| SP | Magenta | — | — | — | — | — | — |
| SP | Yellow | — | — | — | — | — | — |

These deviation values are used to create a FOC compensation printing plate 9 for black, with the following resultant register deviations 10 relative to black:

| | | Remaining Register Deviation 10 | | | | | |
|---|---|---|---|---|---|---|---|
| | | Narrower/Wider [mm] | | | Shorter/Longer [mm] | | |
| Place | Color | AS | MI | BS | AS | MI | BS |
| EP | Black | 0.00 | 0.00 | 0.00 | 0.00 | 0.00 | 0.00 |
| EP | Cyan | −0.02 | 0.01 | 0.02 | 0.00 | 0.03 | 0.07 |
| EP | Magenta | −0.01 | −0.01 | −0.02 | 0.02 | 0.00 | −0.04 |
| EP | Yellow | 0.02 | −0.01 | −0.04 | −0.01 | −0.03 | −0.04 |
| SP | Black | 0.00 | 0.00 | 0.00 | 0.00 | 0.00 | 0.00 |
| SP | Cyan | −0.01 | 0.00 | −0.01 | −0.08 | −0.03 | 0.03 |
| SP | Magenta | 0.00 | 0.00 | −0.01 | 0.04 | 0.02 | −0.03 |
| SP | Yellow | 0.01 | 0.01 | 0.01 | 0.04 | 0.01 | 0.01 |

A comparison between the reduced register deviations 10 that have been obtained by this measure and the initial register deviations 5 without FOC indicates that the register deviation is reduced considerably by calculating the register deviation in accordance with the method of the invention and creating only one printing forme 9 based on the recalculation.

In the present example, the maximum resultant register deviation 10 would be reduced from 0.2 mm to 0.08 mm. The mean register deviation drops from 0.06 mm to 0.018 mm.

Since this deviation meets the majority of quality requirements in terms of maximum acceptable register deviations 11 that occur in practice, maximum results are gained by minimum effort.

The following is a summary list of reference numerals and the corresponding structure used in the above description of the invention:
1 deformation in the printing direction
2 deformation in a direction transverse to the printing direction
3 register cross
4 register deviation
5 measured register deviation
6 absolute total of all register deviations
7 maximum number of color separations to be adapted
8 color separation selected for adaptation
9 adapted color separation
10 remaining register deviation
11 maximum tolerated register deviation
12 control unit

The invention claimed is:

1. A printing method for a printing process with fan-out control for minimizing register deviations by using a computer, the method comprising the following steps:
   printing a test print of a layout including different color separations;
   measuring the register deviations that have occurred relative to a reference color;
   using the computer for calculating an absolute total of the register deviations of all color separations in a transverse direction and a circumferential direction relative to one another;
   using the computer for calculating a total deviation, from transverse direction values and circumferential direction values, for every color;
   using the computer for selecting at least one color separation to be adapted as a function of the calculated absolute total of the register deviations of all color separations;
   using the computer for adapting the at least one selected color separation;
   compensating for the register deviations that have occurred by creating and using at least one printing plate for the adapted at least one color separation;
   using the computer for calculating remaining register deviations of non-adapted color separations when the at least one adapted color separation is used;
   using the computer for evaluating the remaining register deviations in terms of maximum acceptable tolerances;
   using the computer for implementing further measures if the remaining register deviations are outside of the maximum acceptable tolerances; and
   executing the printing process by using the created at least one printing plate.

2. The method according to claim 1, which further comprises selecting and adapting at least one further color separation as the further measures.

3. The method according to claim 1, which further comprises predefining the maximum tolerances for remaining register deviations, by an operator or in an automated way by the computer.

4. The method according to claim 1, which further comprises predefining a maximum number of color separations to be adapted, by an operator or in an automated way by the computer.

5. The method according to claim 1, which further comprises:
   using a reference color as one of the color separations;
   adapting only the color separation of the reference color; and
   choosing a new reference color among remaining color separations.

6. The method according to claim 1, which further comprises adapting at least two color separations being predefined by an operator or by a computer in an automated way.

7. A method for a printing process with fan-out control for minimizing register deviations by using a computer, the method comprising the following steps:
   printing a test print of a layout including different color separations;
   measuring the register deviations that have occurred relative to a reference color;
   using the computer for calculating an absolute total of the register deviations of all color separations in a transverse direction and a circumferential direction relative to one another;
   using the computer for selecting a color separation to be adapted having the greatest deviation of the calculated absolute total of the register deviations of all color separations relative to one another;

using the computer for calculating a total deviation, from transverse direction values and circumferential direction values, for every color;

using the computer for adapting the selected color separation;

compensating for the register deviations that have occurred by creating and using at least one printing plate for the adapted color separation; and executing the printing process by using the created at least one printing plate.

8. A method for a printing process with fan-out control for minimizing register deviations by using a computer, the method comprising the following steps:

printing a test print of a layout including different color separations;

measuring the register deviations that have occurred relative to a reference color;

using the computer for calculating an absolute total of the register deviations of all color separations in a transverse direction and a circumferential direction relative to one another;

using the computer for calculating a total deviation, from transverse direction values and circumferential direction values, for every color;

using the computer for selecting at least one color separation to be adapted as a function of the calculated absolute total of the register deviations of all color separations;

using the computer for implementing the adaptation of the selected at least one color separation by calculating a register deviation based on a difference of the register deviations of the at least one color separation and a mean value of all other color separations;

using the computer for adapting the at least one selected color separation;

compensating for the register deviations that have occurred by creating and using at least one printing plate for the adapted at least one color separation; and executing the printing process by using the created at least one printing plate.

* * * * *